Oct. 23, 1934.  E. M. WHEELOCK  1,977,785
AUTOMOBILE STORAGE DEVICE
Original Filed May 2, 1928    2 Sheets-Sheet 1
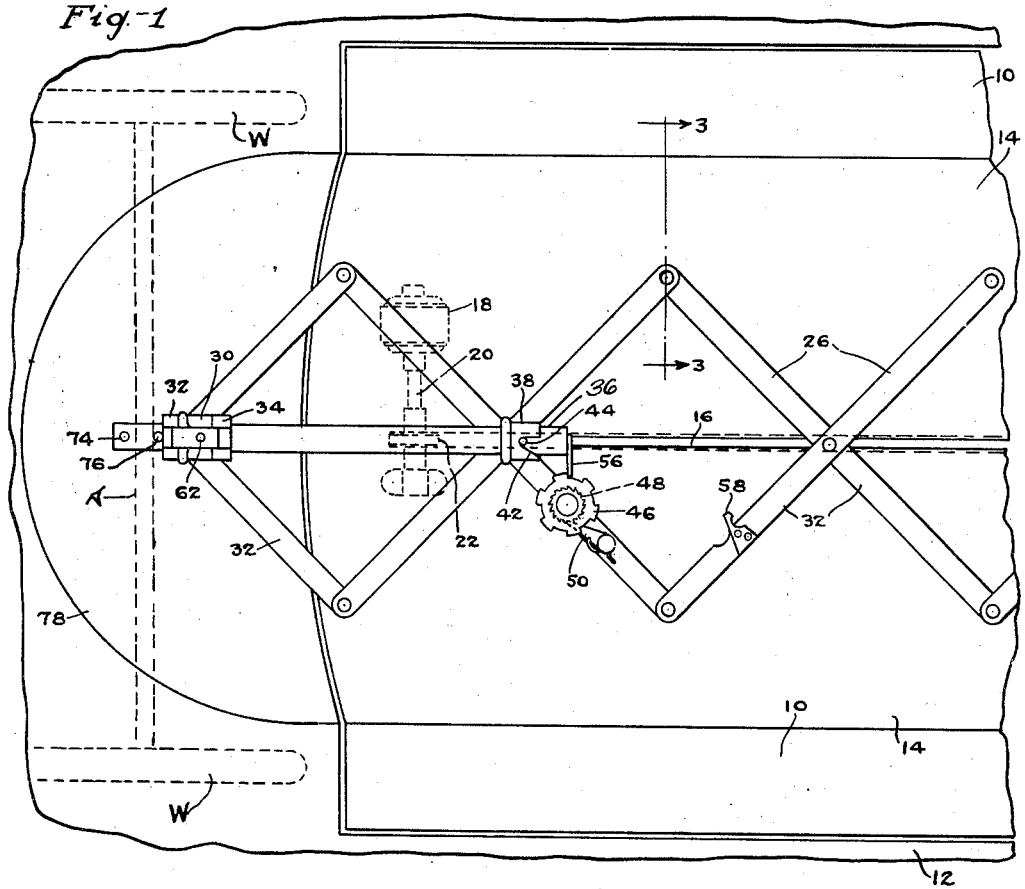
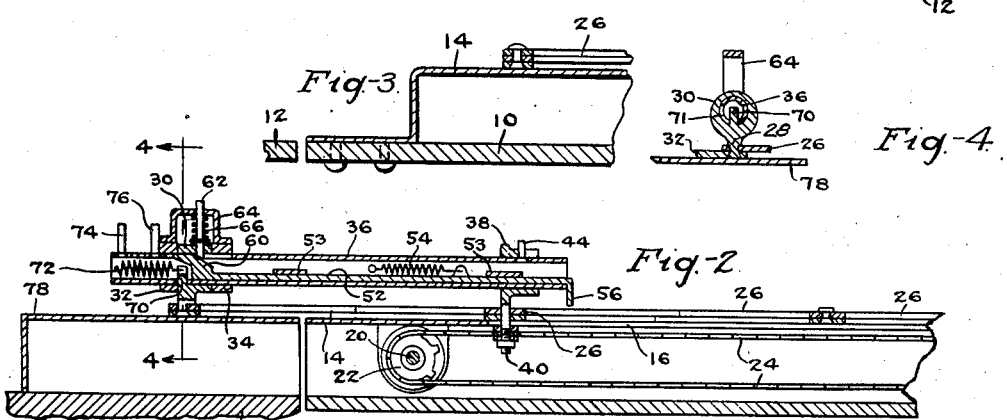
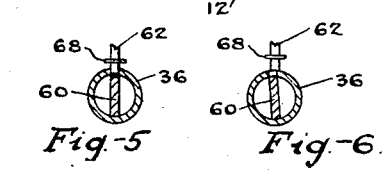
Inventor:
E. M. Wheelock.
By Whiteley and Ruckman
Attorneys.

Oct. 23, 1934.  E. M. WHEELOCK  1,977,785
AUTOMOBILE STORAGE DEVICE
Original Filed May 2, 1928  2 Sheets-Sheet 2

Inventor:
E. M. Wheelock.
By Whiteley and Ruckman
Attorneys.

Patented Oct. 23, 1934

1,977,785

UNITED STATES PATENT OFFICE 1,977,785

AUTOMOBILE STORAGE DEVICE

Edwin M. Wheelock, Minneapolis, Minn.

Application May 2, 1928, Serial No. 274,492
Renewed February 28, 1934

17 Claims. (Cl. 214—95)

My invention relates to automobile storage devices and an object is to provide a power-operated device by means of which automobiles will be placed upon and moved off elevators in order to facilitate the storage of automobiles and their removal in buildings having a plurality of floors, the power-operated device being mounted on the elevator so as to be readily used in connection with any of the floors of the building.

The full objects and advantages of my invention will appear in connection with the detailed description thereof and the novel features of my inventive idea will be particularly pointed out in the claims.

In the accompanying drawings, which illustrate one form in which my invention may be embodied,—

Figure 7:
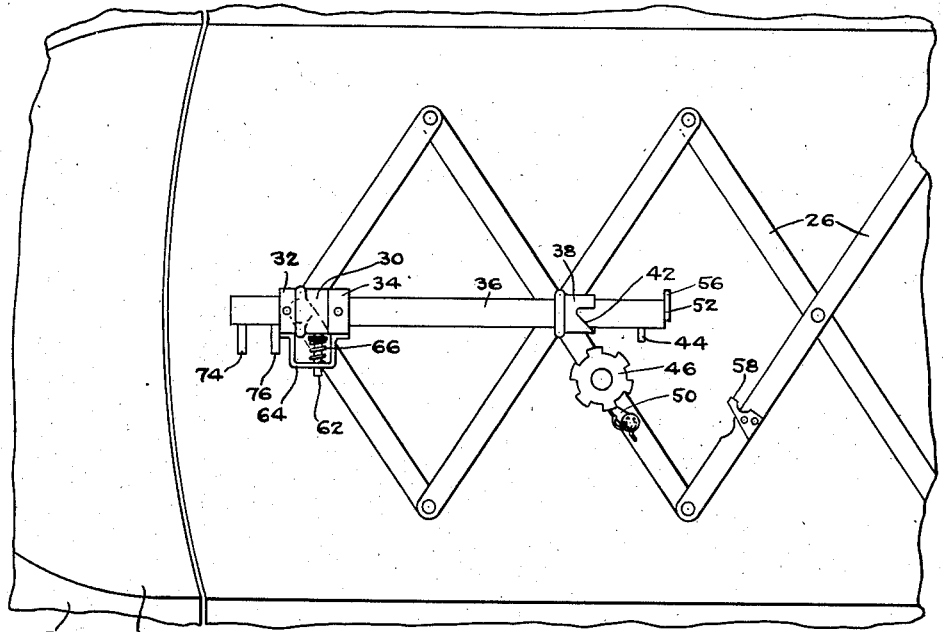
Figure 9:
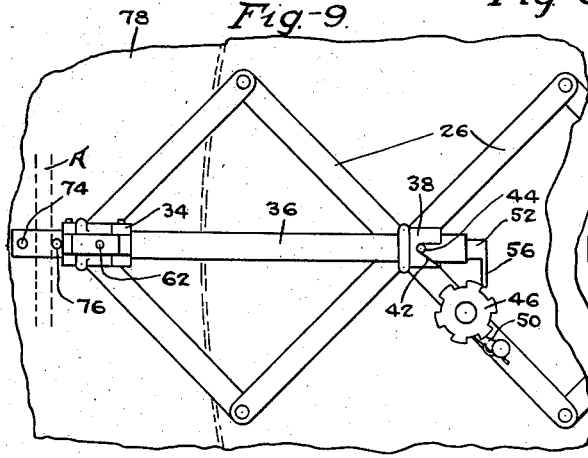
Figure 8:
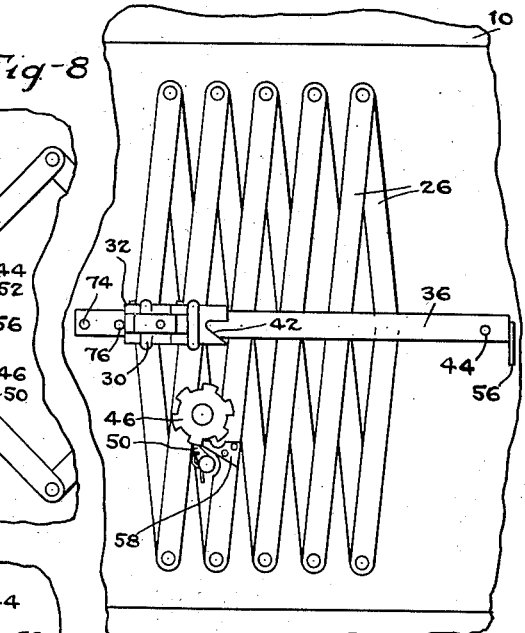
Figure 10:
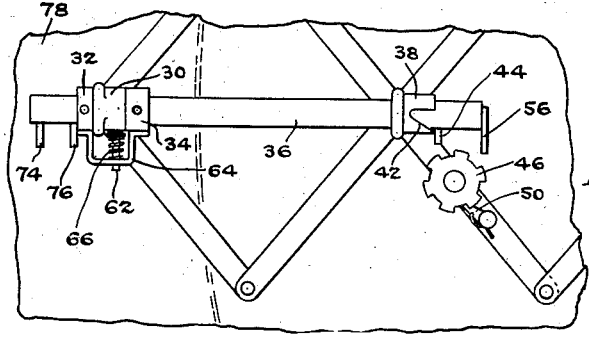

Fig. 1 is a top plan view of the device showing it in extended condition for pulling an automobile upon an elevator platform. Fig. 2 is a view of the device in longitudinal central vertical section. Fig. 3 is a view in transverse section on the line 3—3 of Fig. 1 through a housing which is mounted on the elevator platform. Fig. 4 is a view in vertical section on the line 4—4 of Fig. 2. Fig. 5 is a sectional detail view showing a tube in engaged condition. Fig. 6 is a similar view showing the tube in released condition. Fig. 7 is a plan view showing the device as it is being extended to engage an automobile. Fig. 8 is a plan view showing the device retracted after pulling an automobile upon the elevator platform. Fig. 9 is a plan view showing the device extended after pushing an automobile off the elevator platform. Fig. 10 is a plan view showing the device released from an automobile and ready to be retracted upon the elevator platform.

Referring to the construction shown in the drawings, the numeral 10 designates an elevator platform which may be raised and lowered in any suitable manner so as to register with the floors of a storage building or garage, one of the floors being indicated at 12. A housing 14 is secured upon the platform 10 longitudinally thereof, the width of this housing being such that it may be straddled by the wheels of an automobile. A longitudinal slot 16 extends from a point near one end of the housing 14 to a point near the other end thereof. Within this housing, near one end thereof, there is an electric motor 18 whose shaft 20 has secured thereto a sprocket wheel 22 around which runs a sprocket chain 24 passing directly under the slot 16, this chain also running around a similar sprocket wheel (not shown) at the other end of the housing. It is to be understood that electric connections with the motor may be made in any suitable manner, as, for instance, such as disclosed in my prior application Serial Number 91,080, filed February 27, 1926. Directly above the housing 14 is a lazy-tongs device consisting of a plurality of crossed links 26 pivoted to each other in the usual manner, it being understood that this device is attached at the rear end to the housing or other affixed support by means of the rear pivot of the two end links. The two front links of the lazy-tongs at their front ends are pivotally attached to a projection 28 extending down from a sleeve 30 held between two collars 32 and 34 secured to a tube 36 near its forward end so that the tube may have a movement of rotation in the sleeve 30. Tube 36 is also rotatively mounted in a sleeve 38 from the lower side of which a bolt 40 extends downwardly so as to constitute the pivot for the forward crossed links of the lazy-tongs. As will be seen from Fig. 2, the end of the bolt 40 after passing through the slot 16 of the housing 14, is secured to the sprocket chain 24. The tube 36 is slidable as well as rotatable in the sleeve 38. The rear portion of this sleeve is provided with a notch 42 one wall of which is inclined so that when the pin 44 carried by the rear end of the tube 36 is moved from the position shown in Fig. 7 into that shown in Fig. 9, the tube is given a quarter rotation. Rotatably mounted on one of the forward crossed links just referred to there is a toothed wheel 46 to the underside of which is secured ratchet wheel 48 shown in dotted lines in Fig. 1. A spring-pressed pawl 50 carried by said link engages the ratchet wheel 48 so that the wheel 46 can rotate in clockwise direction only. A bar 52 is slidably held in the tube 36 by means of guides 53 and is normally held forward therein, as shown in Fig. 2, by a coiled spring 54 attached to a lug on the bar and attached to the inside of the tube. The rear end of the bar 52 carries a projection 56 which at certain times engages one of the teeth of the wheel 46, as shown in Fig. 9. A projection 58 is carried by the link of the lazy-tongs which is adjacent the one which carries the wheel 46. When the lazy-tongs are collapsed, as shown in Fig. 8, the projection 58 engages the wheel 46 and turns it in clockwise direction into the position shown in this figure, and also shown in Fig. 9. When the lazy-tongs are now extended, the projection 56 will strike one of the teeth of the wheel 46 so that the bar 52 will be held back, as shown in Fig. 9, while the tube continues to move forwardly. It is to be noted, however, that when the wheel 46 occupies the position shown in Fig. 1, the projection 56 will pass the upper right hand tooth of the wheel 46 without engaging the same for the full extended condition of the lazy-tongs. The bar 52 at its forward end carries an inclined member 60 which when the bar is held back, as shown in Fig. 8 causes a pin 62 to be lifted out of a perforation in the tube 36 as will be understood from Fig. 6. The pin 62 is slidably mounted in the sleeve 30 and in a bracket 64, and is normally held in the perforation in the tube by a coiled spring 66 interposed between the bracket and an enlargement 68 on the pin. The sleeve 30 carries a projection 70 which extends through a ninety degree slot 71 in the tube 36, as shown in Fig. 4. One end of a spring 72 is secured to the projection 70, the other end of this spring being secured to the tube 36, and the spring being so tensioned that it gives the tube a quarter rotation when the pin 62 is lifted. The front end of the tube 36 carries two outstanding projections 74 and 76 which, as will be understood from Fig. 1, are spaced apart a little more than the diameter of the axle A of an automobile. The floor adjacent the elevator is provided with a rounded, raised member 78 which when the elevator platform registers with the floor, forms a continuation of the housing 14 and serves as a guide for the wheels of an automobile.

The operation and advantages of my invention will be understood in connection with the foregoing description. In the use of the device, an automobile on the ground floor is brought close to the elevator shaft so that the wheels W occupy the position shown in Fig. 1. The elevator platform is then lowered so as to bring it into register with the ground floor unless it is already in this position. The lazy-tongs at this time will occupy the position shown in Fig. 8, or as shown in Fig. 7 if partly extended. The electric motor 18 is then operated in the proper direction to fully extend the lazy-tongs. The projections 74 and 76 have been occupying a lateral position, as shown in Fig. 7. When the pin 44 strikes the inclined wall of the notch 42, the tube 36 is given a quarter turn and the projections 74 and 76 are turned up so as to receive the axle A between them. The motor is then operated in the proper direction to retract the lazy-tongs into collapsed condition, as shown in Fig. 8, thus pulling the automobile completely upon the elevator platform. When the lazy-tongs are at about the end of their collapsed condition, the projection 58 engages the wheel 46 and turns it into the position shown in Fig. 8. The elevator platform is then lifted so as to bring it into register with the desired floor. Thereupon the motor is operated to extend the lazy-tongs and push the automobile off the platform and upon the floor. Near the end of this operation, the projection 56 engages the wheel 46, as shown in Fig. 9, thereby holding the bar 52 backwardly in opposition to the tension of the spring 54. This causes the inclined member 60 to lift the pin 62, thereby releasing the tube 36 from its engagement therewith so that the tensioned spring 72 gives the tube 36 a quarter turn and brings the projections 74 and 76 into laterally extended position as shown in Fig. 10 so that the axle of the automobile is released. The motor is operated to bring the lazy-tongs back into the retracted position shown in Fig. 8 so that the device is ready to repeat the operation just described, it being noted that the projection 58 engages the wheel 46 and brings a tooth thereof into the position shown in Figs. 1 and 7 so that the lazy-tongs can now be expanded for engaging another automobile and pulling it upon the platform. It will be understood that the operation of the device is the same as that described when the device is used to take an automobile from an upper floor to the ground floor, or from any floor to any other floor.

I claim:

1. An automobile storage device for buildings having a plurality of floors, comprising an elevator, a housing mounted on said elevator, an extensible mechanism consisting of a plurality of relatively movable parts mounted for right line movement outside of said housing for pushing and pulling automobiles, and operating means for said extensible mechanism mounted within said housing.

2. An automobile storage device for buildings having a plurality of floors, comprising an elevator, a housing mounted on said elevator, said housing containing a longitudinal slot, a traveling member mounted in said housing, a motor for moving said traveling member in forward and backward direction, an extensible mechanism mounted outside of said housing for pushing and pulling automobiles, and a member passing through said slot connecting said extensible mechanism and said traveling member.

3. An automobile storage device for buildings having a plurality of floors, comprising an elevator, a housing mounted on said elevator, said housing containing a longitudinal slot, an endless chain mounted in said housing, a motor for driving said chain in forward and backward direction, a lazy-tongs device mounted outside of said housing for pushing and pulling automobiles, and a member passing through said slot connecting said lazy-tongs device and said chain.

4. An automobile storage device for buildings having a plurality of floors, comprising an elevator, a housing mounted on said elevator, said housing containing a longitudinal slot, an endless chain mounted in said housing, a motor for driving said chain in forward and backward direction, a lazy-tongs device mounted outside of said housing, a member passing through said slot connecting said lazy-tongs device and said chain, and a member movably connected with said lazy-tongs device and adapted to project beyond said elevator for engaging an automobile.

5. An automobile storage device for buildings having a plurality of floors, comprising an elevator, a lazy-tongs device mounted on said elevator, a motor for expanding and contracting said lazy-tongs device, a rotatable member carried by the forward portion of said device, projections on the forward end of said member, and mechanism for giving said member a rotative movement for engaging and disengaging said projections with relation to the axle of an automobile.

6. An automobile storage device for buildings having a plurality of floors, comprising an elevator, a traveling member mounted on said elevator, a lazy-tongs device connected near its forward end to said traveling member, a motor for driving said traveling member in forward and backward direction, a rotatable member carried by the forward portion of said lazy-tongs device, projections on the forward end of said member, and mechanism for giving said member a rotative movement for engaging and disengaging said projections with relation to the axle of an automobile.

7. An automobile storage device for buildings having a plurality of floors, comprising an elevator, an extensible mechanism mounted on said elevator for pulling and pushing automobiles with relation thereto, mechanism for extending and contracting said mechanism, an axle engageable member comprising a rotatable fork carried by the forward portion of said extensible mechanism, and mechanism actuated by said extensible mechanism for rotating said fork to bring said engageable member into axle-engaging position at the end of alternate forward strokes of said extensible mechanism.

8. An automobile storage device for buildings having a plurality of floors, comprising an elevator, an extensible mechanism mounted on said elevator for pulling and pushing automobiles with relation thereto, mechanism for extending and contracting said mechanism, an axle-engageable member comprising a rotatable fork carried by the forward portion of said extensible mechanism, and mechanism actuated by said extensible mechanism for rotating said fork to bring said engageable member into axle-disengaging position at the beginning of alternate retractive strokes of said extensible mechanism.

9. An automobile storage device for buildings having a plurality of floors, comprising an elevator, an extensible mechanism mounted on said elevator for pulling and pushing automobiles with relation thereto, mechanism for extending and contracting said mechanism, an axle-engageable member comprising a rotatable fork carried by the forward portion of said extensible mechanism, mechanism actuated by said extensible mechanism for rotating said fork to bring said engageable member into axle-disengaging position at the beginning of alternate retractive strokes of said extensible mechanism, and mechanism actuated by said extensible mechanism for bringing said engageable member into axle-engaging position at the end of alternate forward strokes of said extensible mechanism.

10. An automobile storage device for multi-storied buildings, comprising an elevator for receiving automobiles directly thereon, mechanism comprising a plurality of rigid, relatively movable members secured to the elevator and adapted to be extended and retracted longitudinally of an automobile beyond the limits of the elevator floor for pushing the automobile from and pulling it on the elevator, and means for extending and retracting said mechanism.

11. An automobile storage device for multi-storied buildings, comprising an elevator, mechanism secured to said elevator consisting of a plurality of parts movable relatively to the elevator and to each other, and means to move said parts to cause the mechanism to be extended and retracted beyond the limits of the elevator floor.

12. An automobile storage device for multi-storied buildings, comprising an elevator, an extensible mechanism consisting of a part secured to the elevator and a plurality of relatively-movable parts connected with said first named part, and means to move said last named parts relatively to cause an end of said mechanism to be projected out beyond the elevator for engaging an automobile.

13. An automobile storage device for multi-storied buildings, comprising an elevator for receiving automobiles directly thereon, mechanism having a part secured to the elevator and a rotatable part adapted to be secured directly to the axle of an automobile upon rotation thereof, connections between said parts to cause the latter one to move bodily in both directions longitudinally of the automobile to push it from and pull it on the elevator, and means to operate said connections.

14. An automobile storage device for multi-storied buildings, comprising an elevator, and mechanism for pushing automobiles therefrom and for pulling them thereon consisting of an interconnected lever-system secured to the elevator and having a part adapted for connection with the automobile and for right line movement.

15. An automobile storage device for multi-storied buildings, comprising an elevator for receiving automobiles directly thereon, an extensible device comprising a plurality of rigid, relatively movable members operable longitudinally of an automobile on the elevator and means for extending the device a distance greater than the length of an automobile to a point beyond the limits of the elevator floor and for retracting it for pushing an automobile from and pulling it on the elevator.

16. An automobile storage device for multi-storied buildings, comprising an elevator and mechanism consisting of a plurality of relatively movable rigid and outwardly movable members secured to the elevator and coacting so as to project and retract a part of said mechanism adapted to push an automobile from and pull it on the elevator.

17. An automobile storage device for multi-storied buildings, comprising an elevator, and extensible mechanism for pushing an automobile from and pulling it on the elevator, consisting of a plurality of inter-connected, relatively-movable parts adapted for right line movement, said parts being nested together on the elevator in their retracted position.

EDWIN M. WHEELOCK.